US011228223B2

(12) United States Patent
Haubenstricker et al.

(10) Patent No.: US 11,228,223 B2
(45) Date of Patent: Jan. 18, 2022

(54) ELECTRIC POWER STEERING SEALING VALVE SYSTEM, A VALVE ASSEMBLY ARRANGED IN THE END CAP

(71) Applicant: STEERING SOLUTIONS IP HOLDING CORPORATION, Saginaw, MI (US)

(72) Inventors: Kevin J. Haubenstricker, Frankenmuth, MI (US); Conrad G. Vorwerck, Bay City, MI (US); Daniel M. Alba, Midland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 642 days.

(21) Appl. No.: 15/984,954

(22) Filed: May 21, 2018

(65) Prior Publication Data

US 2019/0356192 A1 Nov. 21, 2019

(51) Int. Cl.
*H02K 5/10* (2006.01)
*B62D 5/04* (2006.01)
*B62D 6/00* (2006.01)

(52) U.S. Cl.
CPC ............ *H02K 5/10* (2013.01); *B62D 5/0403* (2013.01); *B62D 6/00* (2013.01)

(58) Field of Classification Search
CPC .. H02K 5/15; H02K 5/10; H02K 5/12; H02K 5/124; H02K 5/1285; H02K 5/132; H02K 5/136; H02K 5/1732; H02K 5/225; H02K 7/08; H02K 7/083; H02K 7/085; H02K 2213/03; B62D 6/00; B62D 6/0403

USPC ...... 310/90, 90.5, 88, 89, 87, 400, 405, 406, 310/407, 410, 416, 403, 417, 71; 220/237; 180/422

See application file for complete search history.

(56) References Cited

U.S. PATENT DOCUMENTS

| | | | | |
|---|---|---|---|---|
| 2,218,003 A | * | 10/1940 | Hawley, Jr. | H02K 5/132 310/87 |
| 4,992,689 A | * | 2/1991 | Bookout | F04D 13/10 310/87 |
| 5,715,568 A | * | 2/1998 | Berfield | A47L 7/0038 15/321 |

(Continued)

FOREIGN PATENT DOCUMENTS

| CN | 1692540 A | 11/2005 |
|---|---|---|
| CN | 1783693 A | 6/2006 |

(Continued)

OTHER PUBLICATIONS

Chinese Office Action with Search Report and translation corresponding to Chinese Application No. 2019104257046 dated Jun. 22, 2021.

*Primary Examiner* — Maged M Almawri
(74) *Attorney, Agent, or Firm* — Dickinson Wright PLLC

(57) ABSTRACT

A motor housing provided with a power pack assembly for a power steering system, includes a motor housing wall and an end cap. The motor housing wall extends along a first axis between a first motor housing end and a second motor housing end. The end cap is disposed at the first motor housing end. The end cap defines a projection having a first portion that extends along the first axis and a second portion that extends along a second axis that is offset from the first axis. The second portion is arranged to receive a valve assembly.

20 Claims, 2 Drawing Sheets

(56) References Cited

U.S. PATENT DOCUMENTS

| | | | | |
|---|---|---|---|---|
| 2007/0159017 | A1* | 7/2007 | Martin | H02K 5/136 310/88 |
| 2009/0155101 | A1* | 6/2009 | Fukasaku | F04C 27/00 417/410.1 |
| 2011/0097219 | A1* | 4/2011 | Hsu | H02K 5/132 417/321 |
| 2011/0181221 | A1* | 7/2011 | Asahi | G01D 5/145 318/400.39 |
| 2012/0027629 | A1* | 2/2012 | Tanahashi | F04D 13/0693 417/410.1 |
| 2012/0201702 | A1* | 8/2012 | Talaski | F02M 37/048 417/423.7 |
| 2012/0237372 | A1* | 9/2012 | Fukasaku | F04C 23/008 417/410.1 |
| 2013/0320792 | A1* | 12/2013 | Fukasaku | H02K 11/022 310/89 |
| 2014/0205478 | A1* | 7/2014 | Guitari | F04C 23/008 417/410.1 |
| 2014/0339939 | A1* | 11/2014 | Illingworth | H02K 11/33 310/88 |
| 2014/0375157 | A1* | 12/2014 | Taguchi | F04B 39/00 310/71 |
| 2015/0008000 | A1* | 1/2015 | Eriksen | E21B 33/063 166/363 |
| 2016/0006331 | A1* | 1/2016 | Hong | H02K 33/12 417/416 |
| 2016/0047383 | A1* | 2/2016 | Wilcox | E21B 17/028 310/71 |
| 2016/0128213 | A1* | 5/2016 | Wohrstein | H02K 5/136 73/431 |
| 2016/0164364 | A1* | 6/2016 | Yoneda | H02K 11/30 310/71 |
| 2016/0181884 | A1* | 6/2016 | Rumbaugh | H01R 13/523 310/71 |
| 2017/0096160 | A1* | 4/2017 | Yoda | B62D 5/046 |
| 2017/0194830 | A1* | 7/2017 | Poretti | H02K 5/132 |
| 2019/0356192 | A1 | 11/2019 | Haubenstricker | |

FOREIGN PATENT DOCUMENTS

| | | |
|---|---|---|
| CN | 1825747 A | 8/2006 |
| CN | 101463807 A | 6/2009 |
| CN | 104973121 A | 10/2015 |
| CN | 107013678 A | 8/2017 |
| JP | 2001251804 A | 9/2001 |
| KR | 20120086474 A | 8/2012 |
| KR | 20150026450 A | 3/2015 |

\* cited by examiner

ELECTRIC POWER STEERING SEALING VALVE SYSTEM, A VALVE ASSEMBLY ARRANGED IN THE END CAP

BACKGROUND

Vehicle power steering systems may include various mechanical, electrical and/or hydraulic components that may work in concert to displace a rack or other component that leads to the pivoting of at least one steerable vehicle wheel. Various sealing components may be provided within the power steering system to inhibit the intrusion of foreign objects that may impact the performance of the power steering system. The sealing components of the power steering system may be leak tested prior to installation of the power steering system on to a vehicle. Various ports may be added to a component of the power steering system to facilitate the leak testing. The various ports add complexity to the components of the power steering system.

SUMMARY

According to an embodiment of the present disclosure, a power pack assembly for a power steering system is provided. The power pack assembly includes a motor housing and a valve assembly. The motor housing has a motor housing wall that extends between a first motor housing end and a second motor housing end along a first axis. The motor housing has an end cap disposed at the first motor housing end. The end cap defines a projection that extends from the end cap along the first axis. The projection has a first portion defining a first opening that extends along the first axis and a second portion that extends from the first portion, the second portion defining a second opening that extends along a second axis. The valve assembly is arranged to be disposed within the second opening.

According to another embodiment of the present disclosure, a motor housing provided with a power pack assembly for a power steering system. The motor housing includes a motor housing wall and an end cap. The motor housing wall extends along a first axis between a first motor housing end and a second motor housing end. The end cap is disposed at the first motor housing end. The end cap defines a projection having a first portion that extends along the first axis and a second portion that extends along a second axis that is offset from the first axis. The second portion is arranged to receive a valve assembly.

These and other advantages and features will become more apparent from the following description taken in conjunction with the drawings.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Vehicles may be provided with a power steering system that is arranged to articulate or pivot at least one vehicle wheel responsive to rotation of a steering wheel or commands in or signals provided by an autonomous driving assist system. The power steering system may be an electric power steering system that includes a power steering unit or a power pack assembly 10, as shown in FIGS. 1 and 4.

The power pack assembly 10 is arranged to provide an assistance load or assist force to the rack or other displaceable component to articulate or pivot at least one vehicle wheel. Referring to FIGS. 1 and 4, the power pack assembly 10 includes a motor housing 20, a gear housing or mechanical housing 22 connected to the motor housing 20, and a valve assembly 24.

Figure 2:
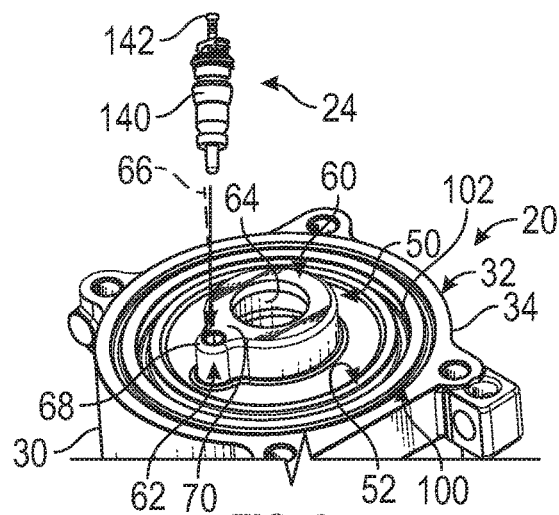
FIG. 2 is a partial perspective view of a motor housing of the power pack.
Figure 3:
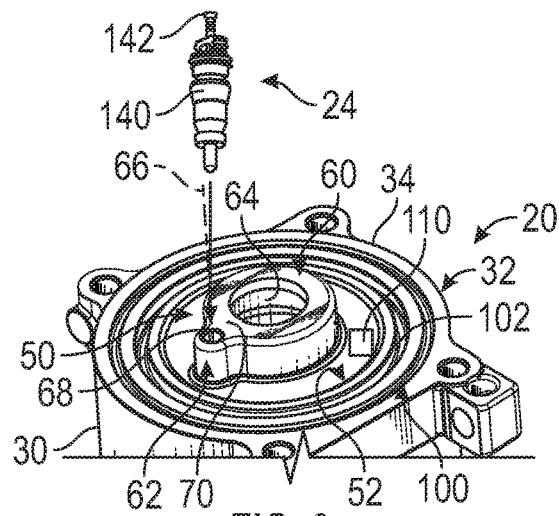
FIG. 3 is a partial perspective view of a motor housing of the power pack.
Figure 4:
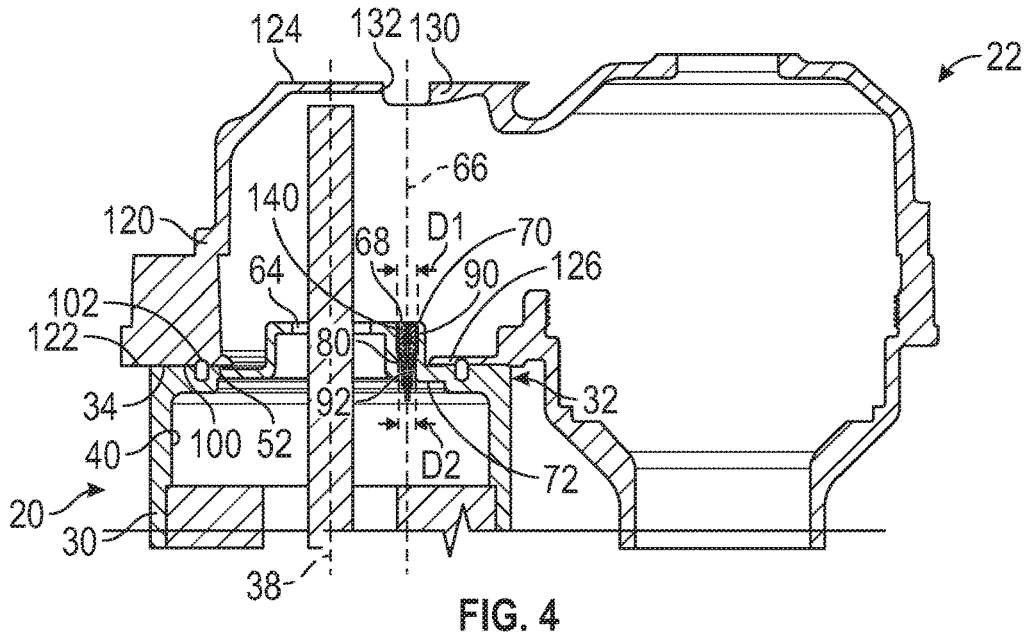
FIG. 4 is a partial cross-sectional view of the power pack and gear housing or mechanical housing of the electric power steering system.

The motor housing 20 includes a motor housing wall 30 and an end cap 32, as shown in FIGS. 2-4. The motor housing wall 30 extends between a first motor housing end 34 and a second motor housing end 36 along a first axis 38. The end cap 32 and the motor housing wall 30 define an interior 40 of the motor housing 20. A motor, such as an electric motor is arranged to be disposed within the interior 40 of the motor housing 20, as shown in FIG. 4.

Figure 1:
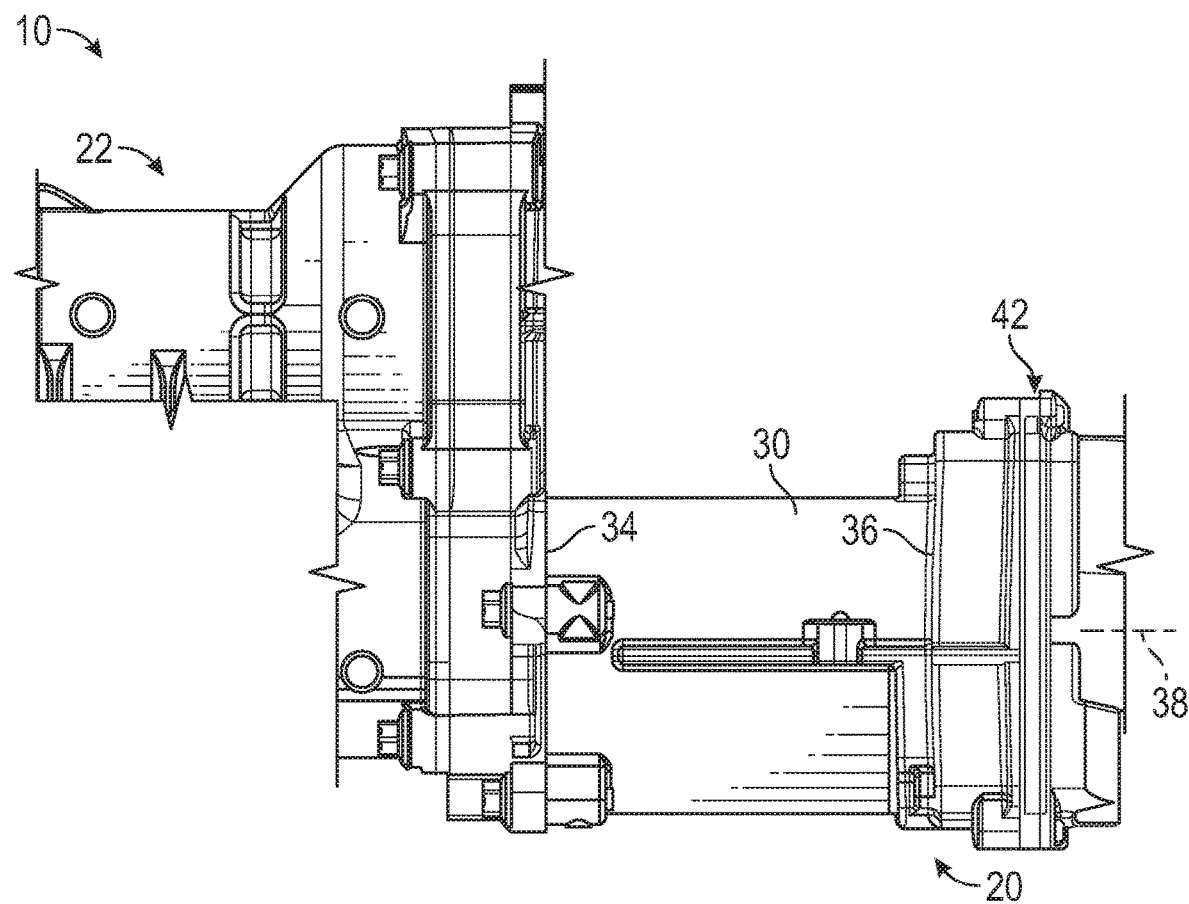
FIG. 1 is a view of a power pack and a partial view of a gear housing or mechanical housing an electric power steering system.

A cover 42 is disposed at the second motor housing end 36, as shown in FIG. 1. At least one electrical connector may extend from or extend at least partially through the cover 42 that is operatively connected to the motor housing 20 to provide electrical and signal communication to the motor that is disposed within the motor housing.

Referring to FIGS. 2-4, the end cap 32 is disposed at the first motor housing end 34. The end cap 32 defines a projection 50 and at least one retaining ring 52. The projection 50 extends from the end cap 32.

The projection 50 includes a first portion 60 and a second portion 62. The first portion 60 extends from the end cap 32 along the first axis 38. The first portion 60 defines a first opening 64 that extends along the first axis 38.

The second portion 62 extends from the end cap 32 along a second axis 66 that is offset from the first axis 38. The second axis 66 is disposed parallel to and is radially offset from the first axis 38. The second portion 62 extends from or is operatively connected to the first portion 60. In other words, the second portion 62 axially and radially extends from the first portion 60 with respect to the first axis 38.

The second portion 62 defines a second opening 68 that extends along the second axis 66 between a first end face 70 of the second portion 62 and a second end face 72 of the second portion 62. The first end face 70 may be a planar surface that extends across or between end surfaces of the first portion 60 and the second portion 62. The second end face 72 may be a planar surface that is disposed opposite the first end face 70 and is disposed within the interior 40 of the motor housing 20. In at least one embodiment, the second end face 72 may be a recessed surface or a countersunk surface of the motor housing 20.

The second portion 62 includes a first retaining feature 80 that is disposed within the second opening 68 and is disposed between the first end face 70 and the second end face 72. The first retaining feature 80 extends towards the second axis 66. In at least one embodiment, a second retaining feature may be axially spaced apart from the first retaining feature 80 along the second axis 66. The second retaining feature may be disposed within the second opening 68 and is disposed proximate the second end face 72. The second retaining feature extends towards the second axis 66. At least one of the first retaining feature 80 and the second retaining feature is arranged to engage a portion of the valve assembly 24, to at least partially retain the valve assembly 24 within the second opening 68.

Referring to FIG. 4, the second portion 62 defines a threaded region 90 that extends between the first end face 70 and the first retaining feature 80. The second portion 62 may also define a non-threaded region 92 that extends between the first retaining feature 80 and the second retaining feature. The second portion 62 may further define a second threaded region that is at least partially defined by the second retaining feature and extends from an axial end of the second retaining feature and the second end face 72.

The second opening 68 of the second portion 62 has a first diameter, D1, which is disposed between the first end face 70 and the first retaining feature 80. The second opening 68 of the second portion 62 has a second diameter, D2, which is disposed between the first retaining feature 80 and second end face 72. The second diameter, D2, being less than the first diameter, D1.

Referring to FIGS. 2-4, the at least one retaining ring 52 is at least partially disposed about the projection 50. A second retaining ring 100 is disposed about the at least one retaining ring 52 and a first sealing groove 102 is defined between the at least one retaining ring 52 and the second retaining ring 100. A mounting flange may extend from the motor housing wall 30.

Referring to FIGS. 3 and 4, a vent 110 may be defined by, disposed on, or disposed within a surface of the end cap 32 of the motor housing 20. The vent 110 is disposed on a surface of the end cap 32 that extends between the projection 50 and the at least one retaining ring 52. The vent 110 is offset from the first opening 64 and the second opening 68. The vent 110 enables portions of the power pack assembly 10 to vent gases or the like to the mechanical housing 22.

Referring to FIGS. 1 and 4, the mechanical housing 22 is arranged to be operatively connected to the end cap 32 of the motor housing 20. The mechanical housing 22 has a mechanical housing wall 120 that extends between a first mechanical housing end 122 and a second mechanical housing end 124 along the first axis 38.

The first mechanical housing end 122 is arranged to engage the end cap 32 of the motor housing 20. The first mechanical housing end 122 is provided with a tab 126 that extends towards the first axis 38 and the projection 50. The tab 126 also engages the end cap 32. The projection 50 of the motor housing 20 extends into an interior of the mechanical housing 22 and the tab 126 is disposed about the projection 50.

The mechanical housing 22 has an end wall 130 that is disposed at the second mechanical housing end 124. The end wall 130 defines an end wall opening 132 that extends through the end wall 130. The end wall opening 132 is proximately aligned with the second opening 68 along the second axis 66. A sealing member may be disposed within the end wall opening 132 to seal the end wall opening 132.

Referring to FIGS. 2-4, the valve assembly 24 is arranged to be disposed within the second opening 68 of the second portion 62. The valve assembly 24 is at least partially retained within the second opening 68 by the threaded region 90 and/or at least one of the first retaining feature 80 and/or the second retaining feature. At least a portion of the valve assembly 24 at least partially extends into the interior 40 of the motor housing 20.

The valve assembly 24 is disposed within a portion of the power pack assembly 10 to eliminate any potential external leakage paths through the valve assembly 24. The valve assembly 24 provides a sealing solution that is robust to water, air, debris, as well as different pressures and thermal conditions.

The valve assembly 24 may be a spring-loaded mechanically actuated self-closing valve having a valve body 140 that engages at least one of the first retaining feature 80 and/or the second retaining feature of the second portion 62. A member 142 is movably disposed within the valve body 140 and is movable between a closed position and an open position. The member 142 may be a spring-loaded member having an end that is disposed generally flush with the first end face 70 of the projection 50. The member 142 is biased towards a closed position by a biasing member to inhibit the entrance of foreign objects into the interior of the motor housing 20 prior to assembly and after assembly of the motor housing 20 with the mechanical housing 22 of the power pack assembly 10.

Referring to FIG. 2, the valve assembly 24 being disposed within the second portion 62 of the projection 50 of the motor housing 20 enables the motor housing 20 to be leak tested separate from the mechanical housing 22. The member 142 of the valve assembly 24 may be actuated to allow a fluid flow into the motor housing 20 such that the motor housing 20 is leak tested. The member 142 of the valve assembly 24 may be subsequently actuated to allow the fluid flow to exit the motor housing 20 upon completion of the leak test.

Referring to FIGS. 2-4, the valve assembly 24 being disposed within the second portion 62 of the projection 50 of the motor housing 20 enables the motor housing 20 to be leak tested while being a assembled to the mechanical housing 22 such that the power pack assembly 10 may be pressure tested or leak tested as a whole. The end wall opening 132 of the end wall 130 of the mechanical housing 22 serves as a port that enables a fixture or actuator to pass through the mechanical housing 22 and actuate the member 142 of the valve assembly 24 to allow a fluid flow through and into the mechanical housing 22 and into the motor housing 20 to leak test the power pack assembly 10. The member 142 of the valve assembly 24 may be subsequently actuated to allow the fluid flow to exit the motor housing 20 upon completion of the leak test. This configuration allows the entire power pack assembly 10 to be leak tested without having to perform a motor housing 20 stand-alone leak test. Furthermore, other sealing members within the power pack assembly 10 are capable of being leak tested in this configuration.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description.

Having thus described the present disclosure, it is claimed:

1. A power pack assembly for a power steering system, comprising:
    a motor housing having a motor housing wall extending between a first motor housing end and a second motor housing end along a first axis, the motor housing having an end cap disposed at the first motor housing end, the end cap defining a projection extending from the end cap along the first axis, the projection having a first portion defining a first opening that extends along the first axis and a second portion extending from the first portion, the second portion defining a second opening that extends along a second axis; and
    a valve assembly arranged to be disposed within the second opening, the valve assembly having a selectively moveable member that includes an open position to allow fluid to flow therethrough before and after a leak test and a closed position to prevent fluid to flow therethrough during the leak test.

2. The power pack assembly of claim 1, wherein the second axis is disposed parallel to and offset from the first axis.

3. The power pack assembly of claim 1, wherein the end cap and the motor housing wall define an interior of the motor housing.

4. The power pack assembly of claim 3, wherein the valve assembly at least partially extends into the interior.

5. The power pack assembly of claim 1, further comprising a vent disposed on the end cap.

6. The power pack assembly of claim 5, wherein the vent is disposed between the projection and a first retaining ring extending from the end cap.

7. The power pack assembly of claim 1, further comprising a mechanical housing arranged to be operatively connected to the motor housing, the mechanical housing having a mechanical housing wall extending between a first mechanical housing end and a second mechanical housing end along the first axis, the mechanical housing having an end wall disposed at the second mechanical housing end, the end wall defining an end wall opening.

8. The power pack assembly of claim 7, wherein the end wall opening is proximately aligned with second opening.

9. The power pack assembly of claim 1, wherein the second opening extends from a first end face of the second portion to a second end face of the second portion.

10. The power pack assembly of claim 9, wherein the second portion includes a retaining feature that is disposed within the second opening.

11. The power pack assembly of claim 10, wherein the retaining feature is disposed between the first end face and the second end face.

12. The power pack assembly of claim 10, wherein the second opening has a first diameter that is disposed between the first end face and the retaining feature.

13. The power pack assembly of claim 12, wherein the second opening has a second diameter that is disposed between the retaining feature and the second end face, the second diameter being less than the first diameter.

14. A motor housing provided with a power pack assembly for a power steering system, comprising:
    a motor housing wall extending along a first axis between a first motor housing end and a second motor housing end; and
    an end cap disposed at the first motor housing end, the end cap defining a projection having a first portion that extends along the first axis and a second portion that extends along a second axis that is offset from the first axis, the second portion being arranged to receive a valve assembly, the valve assembly having a selectively moveable member that includes an open position to allow fluid to flow therethrough before and after a leak test and a closed position to prevent fluid to flow therethrough during the leak test.

15. The motor housing of claim 14, wherein the end cap defines a first retaining ring that is at least partially disposed about the projection.

16. The motor housing of claim 15, wherein the end cap defines a vent that is disposed between the projection and the retaining ring.

17. The motor housing of claim 14, wherein the second portion defines a second opening that extends along the second axis between a first end face of the second portion towards a second end face of the second portion.

18. The motor housing of claim 17, wherein the second portion defines a threaded region that extends between the first end face and a first retaining feature.

19. The motor housing of claim 18, wherein the second portion defines a non-threaded region that extends between the first retaining feature and a second retaining feature disposed proximate the second end face.

20. The motor housing of claim 19, wherein at least one of the first retaining feature and the second retaining feature engages a portion of the valve assembly.

* * * * *